(12) United States Patent
Angenheister

(10) Patent No.: US 8,979,376 B2
(45) Date of Patent: Mar. 17, 2015

(54) SPHERICAL PLAIN BEARING

(75) Inventor: Markus Angenheister, Kempen (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 688 days.

(21) Appl. No.: 12/572,413

(22) Filed: Oct. 2, 2009

(65) Prior Publication Data

US 2010/0092119 A1 Apr. 15, 2010

Related U.S. Application Data

(63) Continuation-in-part of application No. PCT/EP2008/053677, filed on Mar. 27, 2008.

(30) Foreign Application Priority Data

Apr. 4, 2007 (DE) .......................... 10 2007 016 713

(51) Int. Cl.
| | |
|---|---|
| F16C 33/02 | (2006.01) |
| F16C 33/18 | (2006.01) |
| F16C 25/04 | (2006.01) |
| F16C 11/06 | (2006.01) |
| F16C 11/08 | (2006.01) |
| F16C 33/20 | (2006.01) |
| F16C 33/28 | (2006.01) |

(52) U.S. Cl.
CPC .......... F16C 11/0633 (2013.01); F16C 11/083 (2013.01); F16C 33/201 (2013.01); *F16C 33/206* (2013.01); *F16C 33/28* (2013.01); *F16C 2326/05* (2013.01); *F16C 2208/82* (2013.01)
USPC ........... 384/276; 384/203; 384/206; 384/296

(58) Field of Classification Search
CPC .... F16C 23/043; F16C 23/045; F16C 23/046; F16C 23/048; F16C 11/0628; F16C 11/0633; F16C 11/0638; F16C 11/0657
USPC ................. 403/130, 132, 133, 135, 140, 128; 384/42, 403, 206, 208, 209, 210, 276
See application file for complete search history.

(56) References Cited

U.S. PATENT DOCUMENTS

| | | |
|---|---|---|
| 2,689,380 A | 9/1954 | Tait |
| 2,691,814 A | 10/1954 | Tait |
| 2,740,649 A * | 4/1956 | Latzen .......................... 403/140 |

(Continued)

FOREIGN PATENT DOCUMENTS

| | | |
|---|---|---|
| DE | 2944052 A1 | 5/1980 |
| DE | 3241002 A | 5/1984 |

(Continued)

OTHER PUBLICATIONS

International Search Report from PCT/IB2009/007004 dated Feb. 18, 2010, 1 pg.

(Continued)

*Primary Examiner* — Alan B Waits
(74) *Attorney, Agent, or Firm* — Chi Suk Kim; Abel Law Group, LLP

(57) ABSTRACT

A spherical plain bearing for a ball-and-socket joint includes a plain bearing shell. The plain bearing shell comprises a sliding layer containing a sliding material, at least one dimensionally stable support layer, and at least one elastic layer.

12 Claims, 1 Drawing Sheet

(56) References Cited

U.S. PATENT DOCUMENTS

| | | | |
|---|---|---|---|
| 2,788,324 A | 4/1957 | Mitchell | |
| 2,798,005 A | 7/1957 | Love | |
| 2,813,041 A | 11/1957 | Mitchell et al. | |
| 2,835,521 A | 5/1958 | White | |
| 2,855,232 A * | 10/1958 | Kozak | 403/132 |
| 2,995,462 A | 8/1961 | Mitchell et al. | |
| 3,017,209 A | 1/1962 | Thomas | |
| 3,030,132 A * | 4/1962 | Compton | 403/203 |
| 3,058,791 A | 10/1962 | Stallman | |
| 3,194,702 A | 7/1965 | Geller et al. | |
| 3,234,128 A | 2/1966 | McLeish et al. | |
| 3,239,257 A | 3/1966 | White | |
| 3,282,602 A * | 11/1966 | Willingshofer et al. | 280/124.134 |
| 3,331,642 A | 7/1967 | Krauss | |
| 3,495,858 A * | 2/1970 | Kindel | 403/140 |
| 3,507,527 A | 4/1970 | White | |
| 3,544,415 A | 12/1970 | Price et al. | |
| 3,582,166 A | 6/1971 | Reising | |
| 3,711,166 A | 1/1973 | Wayson | |
| 3,781,073 A * | 12/1973 | Jorn et al. | 384/291 |
| 3,881,791 A | 5/1975 | Hentschel | |
| 3,924,907 A | 12/1975 | Czernik et al. | |
| 3,929,396 A | 12/1975 | Orkin et al. | |
| 3,944,376 A * | 3/1976 | Hata | 403/132 |
| 3,958,840 A * | 5/1976 | Hickox et al. | 384/129 |
| 3,993,371 A * | 11/1976 | Orndorff, Jr. | 384/97 |
| 4,080,233 A | 3/1978 | McCloskey et al. | |
| 4,142,833 A | 3/1979 | Rybicki et al. | |
| 4,196,249 A * | 4/1980 | Patrichi | 442/70 |
| 4,231,673 A * | 11/1980 | Satoh et al. | 403/125 |
| 4,238,137 A | 12/1980 | Furchak et al. | |
| 4,423,667 A | 1/1984 | Hayashi | |
| 4,547,434 A | 10/1985 | Sumiyoshi et al. | |
| 4,767,108 A | 8/1988 | Tanaka et al. | |
| 5,033,722 A * | 7/1991 | Lammers | 267/153 |
| 5,143,456 A | 9/1992 | Jordens et al. | |
| 5,143,457 A | 9/1992 | Langhof et al. | |
| 5,433,870 A | 7/1995 | Nakamaru et al. | |
| 5,492,428 A * | 2/1996 | Hellon et al. | 403/122 |
| 5,573,846 A | 11/1996 | Harig et al. | |
| 5,593,233 A | 1/1997 | Kammel et al. | |
| 5,752,780 A * | 5/1998 | Dorr | 403/135 |
| 5,819,881 A | 10/1998 | Stringer | |
| 5,915,842 A * | 6/1999 | Redinger | 384/203 |
| 5,971,617 A | 10/1999 | Woelki et al. | |
| 6,170,990 B1 | 1/2001 | Hawkins | |
| 6,258,413 B1 | 7/2001 | Woelki et al. | |
| 6,464,396 B1 | 10/2002 | Schubert et al. | |
| 6,505,989 B1* | 1/2003 | Pazdirek et al. | 403/135 |
| 6,669,370 B1 | 12/2003 | Storch et al. | |
| 6,702,467 B2 | 3/2004 | Testroet | |
| 6,773,197 B2* | 8/2004 | Urbach | 403/135 |
| 6,824,323 B2* | 11/2004 | Garnier et al. | 403/135 |
| 7,771,120 B2 | 8/2010 | Kagohara et al. | |
| 7,820,298 B2 | 10/2010 | Welsch | |
| 7,887,922 B2 | 2/2011 | Mayston et al. | |
| 7,942,581 B2 | 5/2011 | Leonardelli | |
| 2003/0012467 A1 | 1/2003 | Merot et al. | |
| 2003/0121122 A1 | 7/2003 | Carlstedt et al. | |
| 2003/0134141 A1 | 7/2003 | Okado et al. | |
| 2005/0105961 A1* | 5/2005 | Kondoh | 403/122 |
| 2005/0260431 A1 | 11/2005 | Wolki et al. | |
| 2006/0251887 A1 | 11/2006 | Welsch | |
| 2009/0042040 A1* | 2/2009 | Paul et al. | 428/429 |
| 2010/0040407 A1* | 2/2010 | Rechtien et al. | 403/122 |
| 2010/0092119 A1 | 4/2010 | Angenheister | |
| 2011/0262064 A1 | 10/2011 | Burgeff et al. | |

FOREIGN PATENT DOCUMENTS

| | | |
|---|---|---|
| DE | 3342593 A1 | 6/1985 |
| DE | 3516649 A1 | 11/1986 |
| DE | 3534242 A1 | 3/1987 |
| DE | 3601568 A1 | 7/1987 |
| DE | 101 16 053 A1 | 10/2002 |
| DE | 101 61 866 A1 | 7/2003 |
| DE | 10 2004 015 977 A1 | 10/2005 |
| DE | 698 31 675 T2 | 6/2006 |
| DE | 20 2005 006 868 U1 | 10/2006 |
| DE | 10 2006 021 132 B3 | 11/2007 |
| DE | 10 2007 0167 13 A1 | 10/2008 |
| EP | 0217462 A1 | 4/1987 |
| EP | 0498150 B1 | 9/1994 |
| EP | 1010902 A2 | 6/2000 |
| GB | 875003 A | 8/1961 |
| GB | 2139236 A | 11/1984 |
| GB | 2270720 A | 3/1994 |
| JP | 50-7684 | 3/1975 |
| JP | 54-91665 | 7/1979 |
| JP | 55161918 U | 11/1980 |
| JP | 58124820 A | 7/1983 |
| JP | 58187618 A | 11/1983 |
| JP | 60053213 A | 3/1985 |
| JP | S6113025 A | 1/1986 |
| JP | S6353313 A | 3/1988 |
| JP | S63190931 A | 8/1988 |
| JP | 05071540 A | 3/1993 |
| JP | 06270294 A | 9/1994 |
| JP | H07279947 A | 10/1995 |
| JP | 11001672 A | 1/1999 |
| JP | 2002213453 A | 7/2002 |
| JP | 2005502438 A | 1/2005 |
| KR | 10-1995-0023868 A | 8/1995 |
| KR | 10-2001-0032595 A | 4/2001 |
| WO | 90/12965 A1 | 11/1990 |
| WO | 99/05425 A | 2/1999 |
| WO | 99/28639 A1 | 6/1999 |
| WO | 01/55607 A1 | 8/2001 |
| WO | 2004/036066 A2 | 4/2004 |
| WO | 2006018684 A1 | 2/2006 |
| WO | 2007/128643 A1 | 11/2007 |
| WO | 2010/038137 A1 | 4/2010 |

OTHER PUBLICATIONS

International Search Report from PCT/EP2008/053677 dated Jul. 18, 2008, 2 pgs.

International Search Report from PCT/EP1998/04959 dated Jan. 12, 1999, 2 pgs.

International Search Report from PCT/EP2007/053526 dated Nov. 30, 2007, 2 pgs.

* cited by examiner

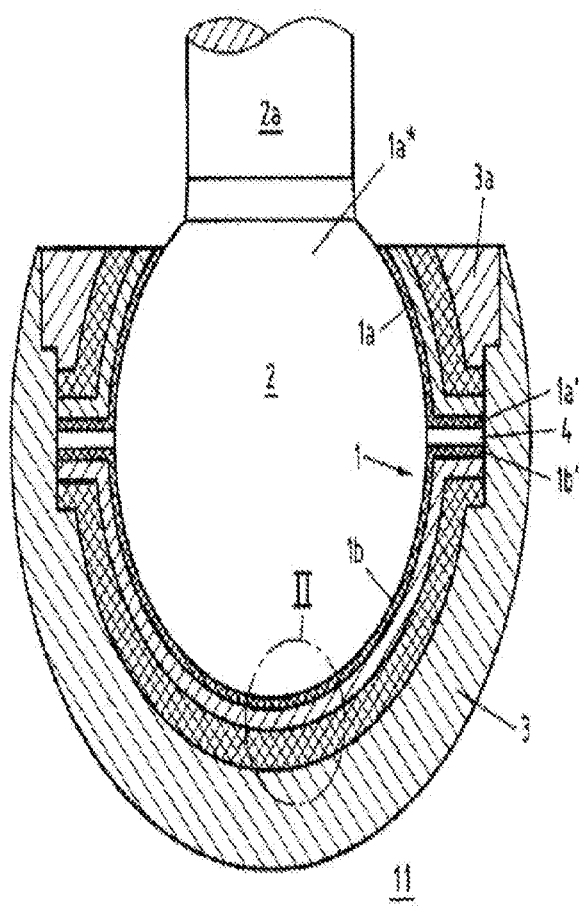

SPHERICAL PLAIN BEARING

CROSS-REFERENCE TO RELATED APPLICATION(S)

The present application is a continuation-in-part and claims priority from PCT Application No. PCT/EP2008/053677, filed Mar. 27, 2008, entitled "Spherical Plain Bearing," naming inventor Angenheister Markus which application is incorporated by reference herein in its entirety. The present application claims priority from DE Application No. 102007016713.1, filed Apr. 4, 2007, entitled "Spherical Plain Bearing," naming inventor Angenheister Markus which application is incorporated by reference herein in its entirety.

FIELD OF THE DISCLOSURE

The disclosure relates to a spherical plain bearing, in particular for a ball-and-socket joint, having a plain bearing shell, wherein the plain bearing shell comprises a sliding layer containing a sliding material and at least one dimensionally stable support layer.

BACKGROUND

Spherical plain bearings are known in the art. They are used, in particular, in ball-and-socket joints which are used in a very wide range of mechanical engineering sectors and particularly in the form of joint components of chassis and steering subassemblies in motor vehicle engineering. The plain bearing shell is installed in a bearing housing and surrounds a ball joint integrally formed on a joint pin. In principle, this geometry allows the joint pin to execute rotational movements in all spatial directions.

In a conventionally designed motor vehicle chassis, the supporting joints, for example, are in the form of grease-lubricated ball-and-socket joints. Aging of the lubricant and of the bearing partners regularly results in caking phenomena after a long stoppage, and so the ball joint "breaks away" from the bearing shell when the motor vehicle is reused. This can be accompanied by distinct cracking noises and can be a clear indication of advanced bearing wear.

GB 875,003 describes a self-lubricating spherical plain bearing of a ball-and-socket joint. The plain bearing shell of this spherical plain bearing is formed from two hemispherical shell elements made from a metallic material. The inner side of these shell elements, which faces toward the ball joint, is coated with a self-lubricating sliding material, for example a mixture of PTFE and lead. The outer edges of the hemispherical shell elements, which edges are situated opposite one another, are provided with bent flanges around which an outer clamping ring engages via its radially inwardly pointing flange. Rubber rings are arranged firstly between the flanges of the clamping ring and secondly between the outer flanges of the shell elements, and as a result the shell elements bear against the encompassed ball joint in a rubber-sprung manner.

The industry continues to demand improved spherical plain bearings with improved vibration damping.

SUMMARY

In an embodiment, a spherical plain bearing for a ball-and-socket joint can include a plain bearing shell. The plain bearing shell can include a sliding layer containing a sliding material, at least one dimensionally stable support layer, and at least one elastic layer.

In an alternate embodiment, a ball-and-socket joint can include a spherical joint head and a spherical plain bearing. The spherical plain bearing can include a plain bearing shell, and the plain bearing shell can include a sliding layer containing a sliding material, at least one dimensionally stable support layer, and at least one elastic layer.

In a further embodiment, a spherical plain bearing for a ball-and-socket joint can include a plain bearing shell. The plain bearing shell can include a dimensionally stable support layer, a sliding layer, and first and second elastic layers. The dimensionally stable support layer can have first and second major surfaces, and the sliding layer can contain a sliding material. The sliding layer can overlie the first surface of the dimensionally stable support layer and the first elastic layer overlying the second surface of the dimensionally stable support layer. The second elastic layer can be between the sliding layer and the first surface of the dimensionally stable support layer.

BRIEF DESCRIPTION OF THE DRAWINGS

The present disclosure may be better understood, and its numerous features and advantages made apparent to those skilled in the art by referencing the accompanying drawings.

FIG. 1 shows a ball-and-socket joint having a bearing housing, a spherical plain bearing and a ball joint, and FIG. 2 shows the layer system of the plain bearing shell of the spherical plain bearing as per detail II in FIG. 1.

FIG. 2a shows a first alternative detailed view of the spherical plain bearing.

FIG. 2b shows a first alternative detailed view of the spherical plain bearing.

The use of the same reference symbols in different drawings indicates similar or identical items.

DETAILED DESCRIPTION

In an embodiment, the plain bearing shell of the spherical plain bearing comprises a layer system of simple construction which has a sliding layer, at least one dimensionally stable support layer and, at least one elastic layer. Since the entire surface area of the sliding layer which is in contact with the corresponding spherical plain bearing partner is underlaid with the elastic layer, optimum vibration damping can be achieved irrespective of the nature and force of the relative movement between the two bearing partners. In addition, the elastic layer which is arranged beneath the sliding layer can bring about effective structure-borne sound decoupling, and this can minimize the transmission of sound from one spherical plain bearing partner to the other. If the spherical plain bearing is used in a motor vehicle chassis, this can provide effective vibration damping and decoupling of the vehicle frame structure and thus of the vehicle interior from noise, vibration and harshness, and this can noticeably increase the driving comfort. The material thickness and material of the support layer which is dimensionally stable during operation of the spherical plain bearing can be selected in such a way that the plain bearing shell can have a high degree of formability, and so the spherical plain bearing can be adapted to a large number of applications.

According to an embodiment, the elastic layer in the plain bearing shell can be prestressed substantially perpendicularly to the layer extent. As a result of this prestressing of the elastic layer, gradual material removal in the sliding layer over the course of the service life of the spherical plain bearing can be compensated for by corresponding expansion of the prestressed elastic layer, and this can ensure gap-free guiding of the bearing partner in the plain bearing shell throughout the service life of the spherical plain bearing. The risk of the bearing being knocked out can be effectively minimized by automatic adjustment by means of the elastic layer which relaxes depending on the material removal.

The layer structure of the plain bearing shell may be different; in this case, it should be understood that the outer layer which is in direct contact with the bearing partner is always formed by the sliding layer. According to an embodiment, it is possible to arrange the support layer between the sliding layer and the elastic layer. In this case, it may additionally be provided that a further support layer is arranged on that side of the elastic layer which is remote from the support layer. In this case, the plain bearing shell may simply be pressed into a bearing housing without the possibility of layers being peeled off. The support layer and the sliding layer can be bonded to one another by means of an adhesive layer. The adhesive material used in this case can be at least one of a fluoropolymer, a cured adhesive, and/or mixtures thereof. The fluoropolymer can include perfluoroalkoxy polymer (PFA), perfluoro(methyl vinyl ether) (MFA), ethylene-tetrafluoroethylene (ETFE), polychlorotrifluoroethylene (PCTFE), polyvinylidene fluoride (PVDF), perfluoroethylene copolymer (FEP), terpolymer of tetrafluoroethylene, hexafluoropropylene, vinylidene fluoride (THV), or any combination thereof. Examples of cured adhesives can include epoxy adhesives, polyimide adhesives, or low-temperature hotmelt adhesives, and suitable thermoplastics. Examples of low-temperature hotmelt adhesive can include ethylene-vinyl acetate and polyether-polyamide copolymers.

In an alternate embodiment, it may also be provided that the elastic layer is arranged between the sliding layer and the support layer. In this configuration, too, it can be possible for the plain bearing shell to be pressed into a bearing housing without any problems. In this case, the sliding layer can be bonded to the elastic layer via an adhesion promoter layer. Likewise, the elastic layer can be bonded to the support layer via an adhesion promoter layer. The adhesion promoter can include at least one reactive polymer, in particular a silane-based reactive polymer, and/or pigments in a solvent. Examples of suitable solvents can include methyl isobutyl ketone (MIBK), xylene, ethanol and water, or ethanol and methyl ethyl ketones (MEK).

In an embodiment, the elastic layer may be formed from different materials which have suitable elasticity. The elastic layer can contain an elastomer, in particular nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoroelastomer. Open-pored materials, for example foams, are also suitable if they have suitable elasticity. Depending on the desired resistance to lubricants, solvents and/or temperature, it is also possible to use a different elastomer, if appropriate with the addition of suitable fillers.

The sliding material present in the sliding layer may contain different materials. The sliding material preferably contains a plastic, preferably a high-temperature plastic, in particular selected from the group consisting of fluoropolymers, polyacetal, polybutylene terephthalate (PBT), polyimides, polyetherimide, polyether ether ketone (PEEK), polyethylene, polysulfone, polyamide, polyphenylene sulfide, polyurethane, polyester, polyphenylene oxide and mixtures thereof. Fluoropolymers can include polytetrafluoroethylene (PTFE), fluorinated ethylene-propylene (FEP), polyvinylidene fluoride (PVDF), polychlorotrifluoroethylene (PCTFE), ethylene-chlorotrifluoroethylene (ECTFE) and perfluoroalkoxy polymer (PFA). An example of a polysulfone can include polyethersulfone. Particular preference is given to using polytetrafluoroethylene (PTFE) owing to its excellent sliding properties.

In an embodiment, the sliding layer can contain lubricants and/or fillers, in particular glass and/or carbon fibers, silicone, graphite, polyether ether ketone, molybdenum disulfide, aromatic polyester, carbon particles, bronze, fluoropolymer, thermoplastic fillers, mineral fillers, or combinations thereof. Examples of thermoplastic fillers can include polyimide (PI), polyamideimide (PAI), polyphenylene sulfide (PPS), polyphenylene sulfone ($PPSO_2$) and liquid crystal polymers (LCP). Examples of mineral fillers can include wollastonite and barium sulfate ($BaSO_4$).

The thickness of the individual layers may be selected differently. Particularly favorable damping and structure-borne sound decoupling properties are achieved in the case of the spherical plain bearing when the thickness of the elastic layer is about ten times the thickness of the sliding layer. Specifically, the thickness of the elastic layer can be about 0.1-1.0 mm, such as from 0.3-0.6 mm. Correspondingly, the thickness of the sliding layer can be 0.05-1.0 mm, such as from 0.1-0.2 mm. The thickness of the dimensionally stable support layer can be from 0.2 mm to 1.0 mm, such as from 0.2 mm to 0.5 mm.

The material of the support layer can be a metallic material, a bearing foil made from a woven metal fabric and PTFE (Norglide® MP), or a composite material made from a PTFE film and a bronze expanded metal (Norglide® SM). Examples of metallic materials can include steel, stainless steel, copper, titanium, bronze, aluminum, or an alloy thereof.

In an embodiment, a ball-and-socket joint as described can ensures effective vibration damping and structure-borne sound decoupling.

The ball-and-socket joint, as shown in FIG. 1, comprises a self-lubricating spherical plain bearing 1 and a ball joint 2 which is mounted without play in the spherical plain bearing 1 and on which a bearing pin 2a is integrally formed. The spherical plain bearing 1 is installed in a bearing housing 3 and is secured in this position via an annular element 3a, which is a constituent part of the bearing housing 3. The bearing housing 3 can be installed within a vehicle chassis 11.

The spherical plain bearing 1 comprises two spherically shaped plain bearing shells 1a, 1b, the upper plain bearing shell 1a comprising a central opening 1a* through which the bearing pin 2a which is integrally formed on the ball joint 2 protrudes out of the ball-and-socket joint. The opening 1a* is dimensioned in such a way as to allow the bearing pin 2a to execute the desired movements in relation to the spherical plain bearing 1. Each of the two plain bearing shells 1a, 1b have an annular, radially outwardly pointing flange 1a', 1b' on their annular edges which face toward one another. An annular interspace 4 is formed between the two flanges 1a', 1b', and this interspace serves to finely adjust the positioning of the bearing shells 1a, 1b in relation to the ball joint 2 which is mounted in the bearing shells. This can ensure that the ball joint 2 is mounted in the bearing shells 1a, 1b without play. In addition, it is possible to compensate for manufacturing tolerances by appropriately setting the interspace 4 for the ball joint 2.

FIG. 2 shows, in detail, the layer structure of the plain bearing shell 1b—the plain bearing shell 1a has an identical design—of the spherical plain bearing 1 of the ball-and-socket joint shown in FIG. 1. A sliding layer 5 faces directly toward the ball joint 2. The sliding material present in this layer is preferably polytetrafluoroethylene (PTFE). It is possible, in principle, to use a large number of sliding materials here, for example those marketed by the applicant under the trademark Norglide®.

The sliding layer 5 is bonded to an underlying, dimensionally stable support layer 7 via an adhesive layer 6. This support layer preferably consists of steel having a thickness of 0.2 mm to 0.5 mm. For its part, the dimensionally stable support layer 7 is bonded to an elastic layer 9, via an adhesion promoter layer 8. The elastic layer preferably contains an elastomer, in particular nitrile rubber. In the ball-and-socket joint, the elastic layer 9 provides excellent vibration damping. The elastic layer 9, with which the entire surface area of the sliding layer 5 of the plain bearing shell 1a, 1b is underlaid, likewise effectively decouples structure-borne sound between the bearing housing 3 and the ball joint 2. Alternatively, as illustrated in FIG. 2a, the elastic layer 9 can be arranged between the sliding layer 5 and the support layer 7 and the sliding layer 5 can be bonded to the elastic layer 9 via an adhesion promoter layer 8. Moreover, in another aspect, depicted in FIG. 2b, another support layer 7a can be disposed on the elastic layer 9, e.g., on the side of the elastic layer 9 that is remote from the first support layer 7.

In the case of the present ball-and-socket joint, the elastic layer 9 in the plain bearing shells 1a, 1b is prestressed perpendicularly to the layer extent, i.e. in the radial direction of the ball-and-socket joint. This has the effect that gradual material removal, for example in the sliding layer 5, over the course of the service life of the spherical plain bearing 1 is compensated for by correspondingly expanding the prestressed elastic layer 9. This ensures guiding of the ball joint 2 in the spherical plain bearing 1 without play throughout the service life of the ball-and-socket joint.

In order to obtain optimum damping properties, the thickness of the elastic layer 9 in the present ball-and-socket joint is preferably ten times the thickness of the sliding layer. In the present case, the thickness of the sliding layer is about 0.1 mm and the thickness of the elastic layer is about 0.4 mm.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and FIG.s are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A spherical plain bearing for a ball-and-socket joint, comprising:
   two plain bearing shells, each plain bearing shell comprising a sliding layer containing a sliding material, at least one elastic layer, a stable support layer arranged between the sliding layer and the elastic layer, the stable support layer comprising a metallic material, and a further support layer provided on a side of the elastic layer which is remote from the support layer, wherein each of the two plain bearing shells have an annular, radially outwardly pointing flange, wherein the sliding layer is bonded to the support layer by an adhesive layer, the adhesive layer comprising a fluoropolymer.

2. The spherical plain bearing of claim 1, wherein the elastic layer in the plain bearing shell is prestressed substantially perpendicularly to the layer extent.

3. The spherical plain bearing of claim 1, wherein the elastic layer is bonded to the support layer and the further support layer via an adhesion promoter layer.

4. The spherical plain bearing of claim 1, wherein the elastic layer contains an elastomer.

5. The spherical plain bearing of claim 1, wherein the sliding material includes a plastic.

6. The spherical plain bearing of claim 5, wherein the plastic includes a high-temperature plastic.

7. The spherical plain bearing of claim 1, wherein the sliding layer contains lubricants and/or fillers.

8. The spherical plain bearing of claim 1, wherein the thickness of the elastic layer is from about 0.1 to 1.0 mm.

9. The spherical plain bearing of claim 1, wherein the thickness of the sliding layer is from 0.05 to 1.0 mm.

10. The spherical plain bearing of claim 1, wherein the thickness of the stable support layer is from 0.2 mm to 1.0 mm.

11. The spherical plain bearing of claim 1, wherein the support layer consists of a bearing foil made from a woven metal fabric and PTFE, or a composite material made from a PTFE film and a bronze expanded metal.

12. A ball-and-socket joint comprising:
   a spherical joint head, and
   a spherical plain bearing, wherein the spherical plain bearing is designed as claimed in claim 1.

* * * * *